(12) United States Patent
Huang et al.

(10) Patent No.: US 12,481,907 B2
(45) Date of Patent: Nov. 25, 2025

(54) METHODS AND SYSTEMS FOR TENSOR NETWORK CONTRACTION BASED ON HYPERGRAPH DECOMPOSITION AND PARAMETER OPTIMIZATION

(71) Applicant: Alibaba Group Holding Limited, Grand Cayman (KY)

(72) Inventors: Jiachen Huang, Hangzhou (CN); Jianxin Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1138 days.

(21) Appl. No.: 17/238,870

(22) Filed: Apr. 23, 2021

(65) Prior Publication Data
US 2021/0334690 A1   Oct. 28, 2021

Related U.S. Application Data (60) Provisional application No. 63/015,116, filed on Apr. 24, 2020.

(51) Int. Cl.
*G06N 20/00* (2019.01)
*G06F 18/214* (2023.01)
(Continued)

(52) U.S. Cl.
CPC .......... *G06N 10/60* (2022.01); *G06F 18/214* (2023.01); *G06F 18/2323* (2023.01); *G06N 10/80* (2022.01)

(58) Field of Classification Search
CPC ... G06F 18/214; G06F 18/2323; G06N 10/00; G06N 10/80
See application file for complete search history.

(56) References Cited

U.S. PATENT DOCUMENTS 9,471,377 B2   10/2016   Baskaran et al.
10,452,989 B2  10/2019   Majumdar
(Continued)

FOREIGN PATENT DOCUMENTS

WO   WO2021071379 A1   4/2021

OTHER PUBLICATIONS

Dudek, Jeffrey M., Leonardo Duenas-Osorio, and Moshe Y. Vardi. "Efficient contraction of large tensor networks for weighted model counting through graph decompositions." arXiv preprint arXiv:1908.04381 (2019). (Year: 2019).*

(Continued)

*Primary Examiner* — David R Vincent
(74) *Attorney, Agent, or Firm* — Lee & Hayes, P.C.

(57) ABSTRACT

Methods and systems for tensor network contraction are provided. A method implemented by a computing host includes obtaining a plurality of tensor nodes associated with a tensor network and a plurality of indices respectively associated with the plurality of tensor nodes; generating a graph associated with the tensor network, wherein the plurality of tensor nodes correspond to a plurality of vertices of the graph and the plurality of indices correspond to a plurality of edges of the graph, respectively; decomposing the graph into a plurality of sub-graphs; and for each sub-graph of the plurality of sub-graphs, iteratively decomposing a current sub-graph into a plurality of next-tier sub-graphs until a size of each of the plurality of next-tier sub-graphs is less than a pre-set threshold.

20 Claims, 5 Drawing Sheets

(51) Int. Cl.
*G06F 18/2323* (2023.01)
*G06N 10/60* (2022.01)
*G06N 10/80* (2022.01)

(56) References Cited

U.S. PATENT DOCUMENTS

| | | |
|---|---|---|
| 10,592,626 B1 | 3/2020 | Pednault et al. |
| 10,984,152 B2 | 4/2021 | Rubin |
| 2015/0052092 A1 | 2/2015 | Tang et al. |
| 2021/0081804 A1 | 3/2021 | Stojevic et al. |
| 2022/0245499 A1* | 8/2022 | Schutski ................ G06N 10/00 |

OTHER PUBLICATIONS

Kourtis, Stefanos, et al. "Fast counting with tensor networks." SciPost Physics 7.5 (2019): 060. (Year: 2019).*

* cited by examiner

METHODS AND SYSTEMS FOR TENSOR NETWORK CONTRACTION BASED ON HYPERGRAPH DECOMPOSITION AND PARAMETER OPTIMIZATION

PRIORITY

This U.S. Patent Application claims priority to U.S. Provisional Patent Application No. 63/015,116, filed on Apr. 24, 2020, entitled "METHODS AND SYSTEMS FOR TENSOR NETWORK CONTRACTION BASED ON HYPERGRAPH DECOMPOSITION AND PARAMETER OPTIMIZATION", and is fully incorporated by reference herein in its entirety.

BACKGROUND

Tensor networks are fundamental tools with a wide range of applications in mathematics, physics, computer engineering, and data science. In the past two decades, tensor networks have also been adopted to simulate quantum circuits in quantum computing simulation platforms. In the absence of viable implementations of full-fledged quantum computers, non-quantum computers are utilized to perform computations simulating quantum algorithms. Given that the data can be represented as multi-dimensional arrays or tensor nodes and the data set can be represented as a tensor network, finding the best possible contraction paths for the tensor network with an improved effect on computation time and memory footprint may enable quantum computations to be simulated without fully simulating the full dimensional space of quantum computations.

A tensor network is a computational problem of computing a tensor, given a hypergraph with the vertices associate with the tensor nodes as inputs. A contraction tree is a formulation of "compilation" of the computational problem to a program that can be executed. Tensor network contraction is execution of the program represented by the contraction tree. The running time and space of the tensor network contraction greatly depends on the quality of the contraction tree, and thus, it is important to find good contraction trees for the tensor network. An existing contraction scheme for the tensor network is based on standard matrix product and occupies a large amount of communication bandwidths and memory capacity. Another existing contraction scheme for the tensor network complies with handcrafted contraction orders. Yet another existing contraction scheme for the tensor network decomposes the tensor network, without optimization of the parameters, into low-rank subnetworks. With the bandwidths and memory constraints, the existing tensor network contraction schemes are inefficient in finding an optimal contraction tree and less adaptive to dynamic changes in the tensor network.

SUMMARY

This summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Methods and systems for tensor network contraction are provided. The present disclosure implements hypergraph decomposition and parameter optimization in the tensor network contraction. A tensor network is denoted as a graph, such as a hypergraph. Each tensor node is denoted a vertex of the graph and an index associated with the tensor node is denoted as an edge of the graph. In implementations, when two indices respectively associated with two tensor nodes have a same dimension, these two tensor nodes may form a new tensor node by a contraction computation. The contraction computation may include matrix product or tensor dot product. The hypergraph decomposition refers to decomposing a graph into two or more sub-graphs with a minimum count of edges that connect different sub-graphs.

According to the present disclosure, a method for finding contraction trees associated with a tensor network starts from a top layer of the graph. The method decomposes the graph into a plurality of sub-graphs using a multi-partite decomposition algorithm. The method iteratively decomposes each sub-graph of the plurality of sub-graphs using a bipartition decomposition algorithm until the size of the sub-graph is less than a pre-set threshold. When the size of each sub-graph of the plurality of sub-graphs is less than the pre-set threshold, the graph decomposition ends and yields a plurality of sub-graphs. The plurality of sub-graphs may correspond to a plurality of contraction trees, which depict the contraction sequence of the tensors. The method traces back the vertices in the plurality of sub-graphs and generate the plurality of contraction trees. In implementations, the tensor network may be represented as a hypergraph where an hyperedge corresponds to the indices of the correlated tensors and may join any number of nodes.

In implementations, the method dynamically optimizes a first set of parameters associated with the multi-partite decomposition algorithm and/or a second set of parameters associated with the bipartition decomposition algorithm. The first set of parameters associated with the multi-partite decomposition algorithm may include, but is not limited to, a number of partitions to decompose a current graph or a current sub-graph, a balance parameter, etc. The second set of parameters associated with the bipartition may include, but is not limited to, a balance parameter. The balance parameter may include a number of nodes in the sub-graph and/or a number of edges in the sub-graph. The first set of parameters may be configured to be the same as the second set of parameters. Alternatively, the first set of parameters may be configured differently from the second set of parameters. In implementations, the multi-partite decomposition algorithm may use any algorithms that take a graph having a plurality of vertices and edges that represent the tensor network as an input and output a plurality of partitions of the graph. Each of the plurality of partitions represents a sub-graph including a set of tensor nodes of the tensor network. In implementations, the multi-partite decomposition algorithm may use any algorithms that take a hypergraph having a plurality of vertices and hyperedges that represent the tensor network as an input and output a plurality of partitions of the hypergraph. Each of the plurality of partitions represents a sub-graph including a set of tensor nodes of the tensor network. The present disclosure achieves an optimal contraction approach by decomposing the top layer of the graph into a plurality of sub-graphs, iteratively decomposing a sub-graph at other layers of the graph into two sub-graphs, and optimizing the parameters associated the decomposing algorithms implemented in each iteration of the graph decomposition.

In implementations, once initial contraction trees are found via the iterative decomposition of the hypergraph, the method may evaluate costs of the initial contraction trees. When the cost of an initial contraction tree meets a termination condition, the method may determine the initial contraction tree as the optimal contraction tree. The termination condition may include that a computation cost of the contraction tree is less than a first preset threshold. Additionally or alternatively, the termination condition may include that a storage cost of the contraction tree is less than a second preset threshold. When the costs of multiple initial contraction trees meet the termination condition, the method may determine one of the multiple initial contraction trees, which has the best performance, as the optimal contraction tree. For example, an initial contraction tree having the least computation cost and/or the least storage cost is determined as the optimal contraction tree. When the cost of an initial contraction tree does not meet a termination condition, the method may update the first set of parameters associated with the multi-partite decomposition algorithm and/or a second set of parameters associated with the bipartition decomposition algorithm, and repeat the hypergraph decomposition until the cost of at least one contraction tree meets the termination condition. The method terminates the decomposition operation and outputs the at least one contraction tree as the optimal contraction tree.

According to the present disclosure, the top-layer hypergraph decomposition is performed using a multi-partite decomposition algorithm with a first set of parameters, and the subsequent layers decompositions are performed using a bipartition decomposition algorithm with a second set of parameters. By dynamically adjusting/optimizing the first set of parameters and the second set of parameters, the present disclosure can generate an optimal contraction tree that uses less computation time and/or less storage space. Thus, the present disclosure effectively improves the contraction speed of the tensor network, for example, to be tens of thousands faster than the decomposing approach according to pre-set orders and/or invariant parameters, thereby increasing efficiency of quantum circuit computation over existing contraction methods.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIGS. 2(a)-2(d) illustrate example tensor network states in accordance with an implementation of the present disclosure.

DETAILED DESCRIPTION

The application describes multiple and varied embodiments and implementations. The following describes an example framework that is suitable for practicing various implementations. Next, the following describes example systems, devices, and processes for implementing a distributed training system.

FIGS. 1(a)-1(e) illustrate example elements of a tensor network in accordance with an implementation of the present disclosure.

Figure 1:
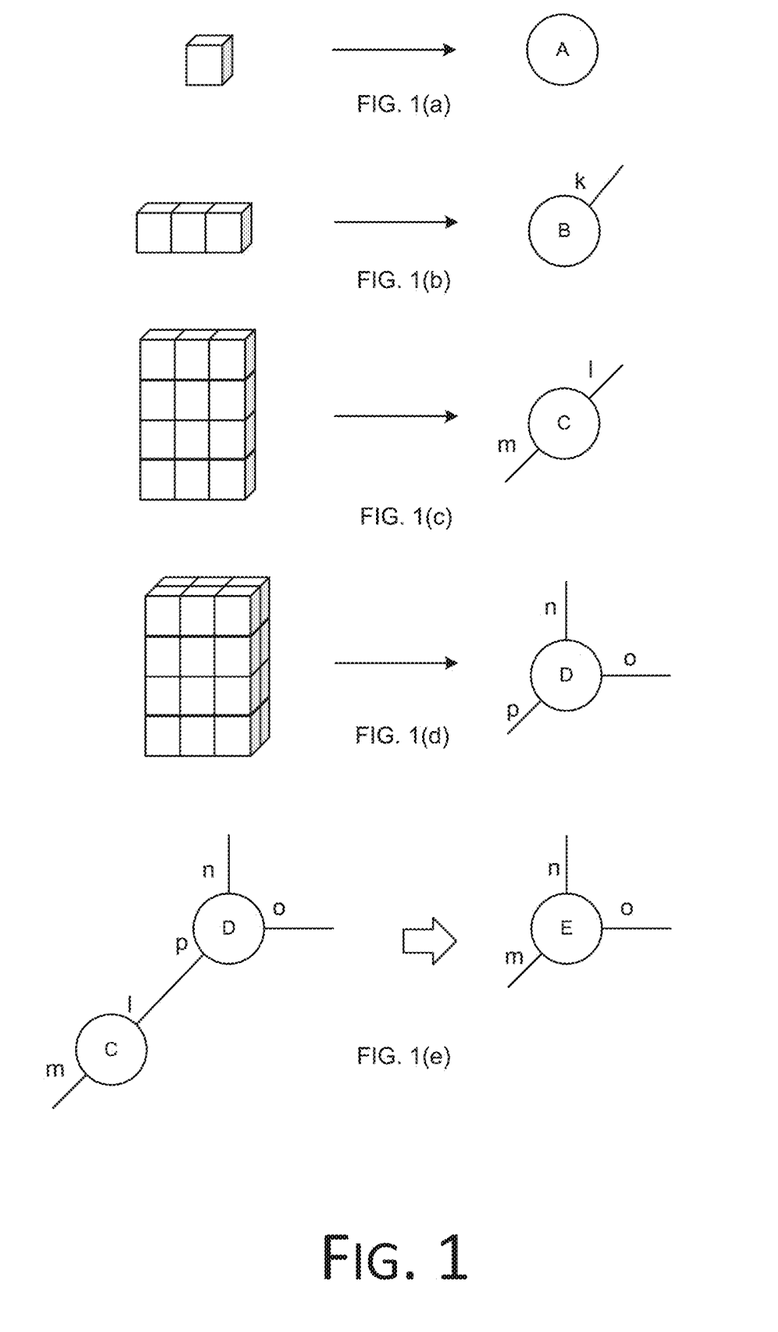
FIGS. 1(a)-1(e) illustrate example elements of a tensor network in accordance with an implementation of the present disclosure.

Tensor networks are widely used in a wide range of applications such as, chemistry and physics. Their graphical structure provides an efficient way for expressing and reasoning about quantum states and circuits. The basic elements of a tensor network are tensors, which can be depicted as a vector or a matrix to represent high-order data. FIG. 1(a)-FIG. 1(e) illustrate tensors in different order configurations and their graphical representations. FIG. 1(a) illustrates a zeroth-order tensor and its graphical representation. The zeroth-order tensor may also be referred to as a scalar, which represents quantities with magnitude but no direction. During computation, the scalar is a single function, which is invariant under changes of the coordinate systems. In the graphical representation, the zeroth-order tensor may be depicted as a node A with no edge. FIG. 1(b) illustrates a first-order tensor and its graphical representation. The first-order tensor may also be referred to as a vector with a dimension k. In the graphical representation, the first-order tensor may be depicted as a node B with an index of k. The example first-order tensor shown in FIG. 1(b) is depicted as node B with an index of 3. FIG. 1(c) illustrates a second-order tensor and its graphical representation. The second-order tensor may also be referred to as a matrix with a dimension $\{l, m\}$. In the graphical representation, the second-order tensor may be depicted as a node C with indices of $\{l, m\}$. The example second-order tensor shown in FIG. 1(c) is depicted as node C with indices of $\{3, 4\}$. FIG. 1(d) illustrates a third-order tensor and its graphical representation. In the graphical representation, the third-order tensor may be depicted as a node D with indices of $\{n, p, o\}$. The example third-order tensor shown in FIG. 1(c) is depicted as node C with indices of $\{4, 3, 2\}$. It should be appreciated that the tensors and the associated numerical indices, as shown in FIGS. 1(a)-1(d), are merely for illustration purpose. A tensor may be configured with an order greater than three with any numerical indices.

When two tensors have a sharing order (i.e., the graphical representations of the two tensors having an index with a same dimension), these two tensors can contract to form a new tensor. For example, index l of tensor C shown in FIG. 1(c) and index p of tensor D shown in FIG. 1(d) have a same value of 3. The contraction of tensor C and D forms a new tensor E, as shown in FIG. 1(e). The newly formed tensor E has indices of $\{n, m, c\} = \{4, 4, 2\}$. The indices of $\{n, m, o\}$ may be also referred to as visible indices and illustrated as open edges in the graphical representation. The indices of $\{l, p\}$ may be also referred to as bond indices or dumb indices and illustrated as an internal edge that connects or entangles two contracted tensors.

The contraction of tensors may be interpreted as eliminating the sharing orders between two source tensors. As tensors represent multi-order data sets, a tensor network formed by a large number of tensors may represent high-order data sets. Simulations that traverse all the high-order data sets consume computation expense and storage space. By performing tensor contractions, a high-order tensor network may be decomposed into one or more low-order tensor networks to facilitate computation efficiency.

Figures 2, 2A, 2D:
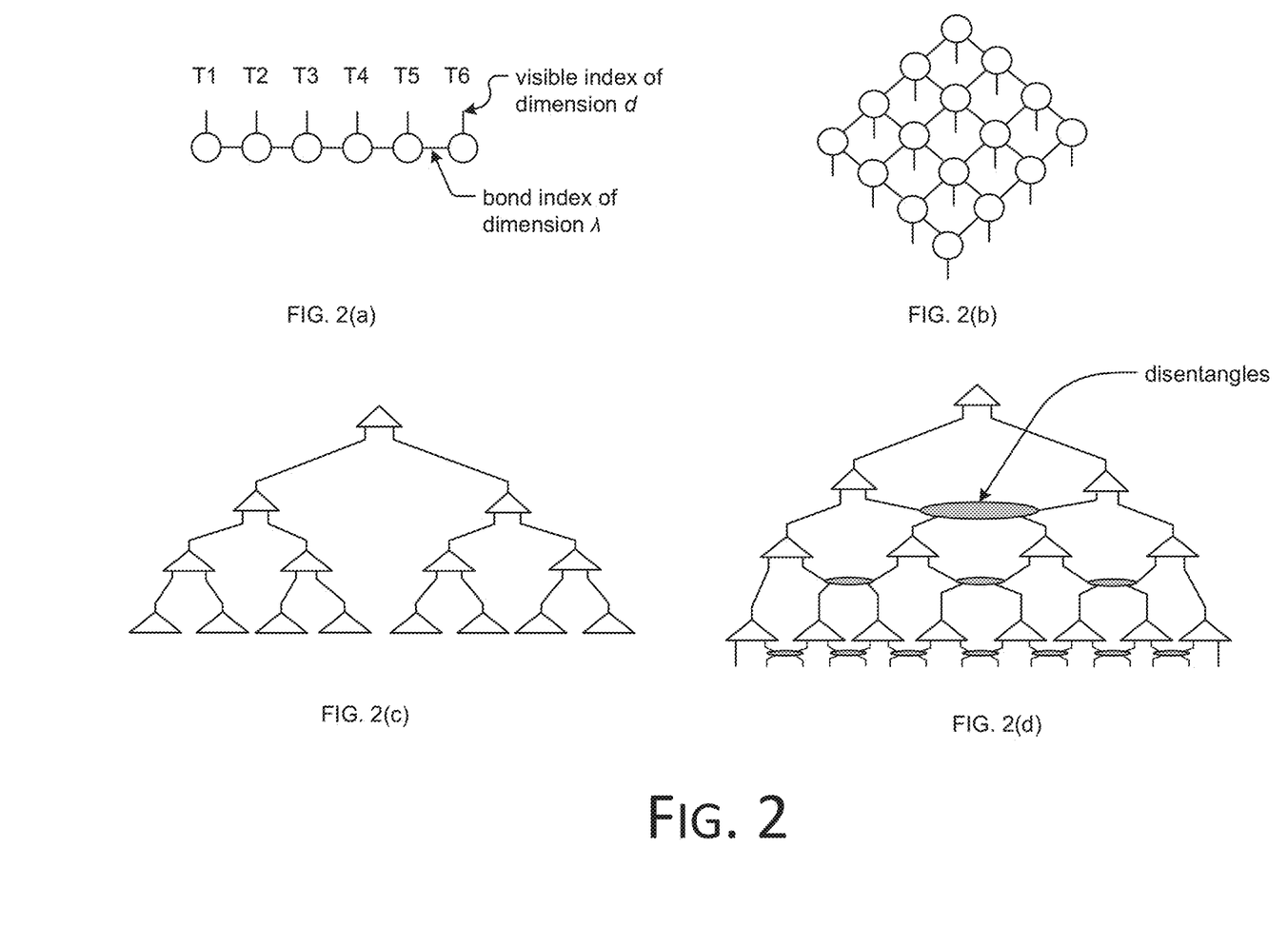

FIGS. 2(a)-2(d) illustrates example tensor network states in accordance with an implementation of the present disclosure. FIG. 2(a) illustrates a matrix product state (MPS) or tensor train (TT) tensor network. The MPS tensor network is a factorization of a tensor with N indices into a chain-like product of third-order tensors. The MPS tensor network as shown in FIG. 2(a) has N=6 indices, where each of the indices has dimension d. The bond index associated with the MPS tensor network λ may be denoted as $\lambda = d^{N/2}$. The MPS tensor network may be also referred to as a one-dimensional entanglement structure. FIG. 2(b) illustrates a projected entangled pair state (PEPS) tensor network. The PEPS tensor network generalizes the MPS or TT tensor network from a one-dimensional network to a network on an arbitrary graph. From a quantum information viewpoint, the PEPS tensor network may be viewed as maximally correlated or entangled tensors in multiple copies of the tensor index space which are then projected into a single copy of the index space. The PEPS tensor network may be also referred to as a tensor grid or a tensor lattice network. FIG. 2(c) illustrates a tree tensor network state (TTN). TTN is a generalization of the MPS that can code more general entanglement states. Unlike the MPS where the tensors are aligned in a one-dimensional array, the TTN is represented by a tree graph. FIG. 2(d) illustrates a multiscale entanglement renormalization ansatz (MERA) state. The MERA may be interpreted as a layered TTNS with added disentangles. Both TTN and MERA are real space renormalization group structures. However, the tensors on the highest level of an optimized TTN contain information about the local entanglement on its lowest level, which reduces the computation efficiency. MERA overcomes the computation inefficiency by introducing the disentangles between the layers to remove short range entanglements. It should be appreciated that the tensor network states shown in FIG. 2 are merely for illustration purpose. Other tensor network states may be implemented to achieve computation efficiency.

Figure 3:
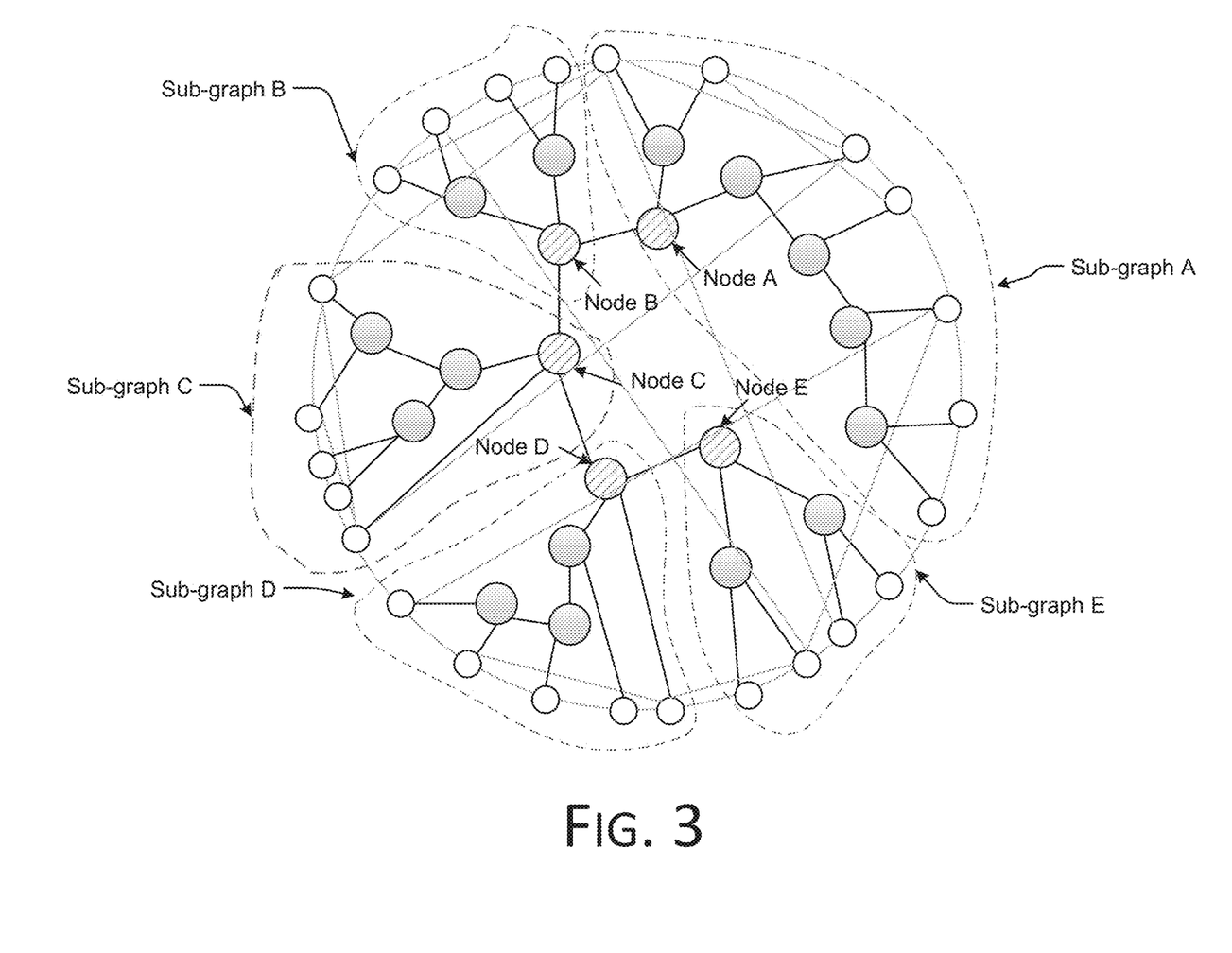
FIG. 3 illustrates example illustrations of a tensor network contraction based on hypergraph decomposition according to example embodiments of the present disclosure.

FIG. 3 illustrates example illustrations of a tensor network contraction based on hypergraph decomposition according to example embodiments of the present disclosure. In tensor network contraction, a large-scale tensor network represented as a graph may be decomposed into one or more sub-graphs such that the number of edges across the one or more sub-graphs is minimum. In implementations, the large-scale tensor network may be represented as a hypergraph where an hyperedge may join any number of nodes and the hyperedge corresponds to the indices of the correlated tensors.

As shown in FIG. 3, a hypergraph representing a tensor network is decomposed into a plurality of sub-graphs including sub-graph A, sub-graph B, sub-graph C, sub-graph D, and sub-graph E. The graph decomposition of the tensor network may start from a plurality of nodes, which serve as the top-layer tensors. For example, node A is the top-layer tensor of sub-graph A, node B is the top-layer tensor of sub-graph B, node C is the top-layer tensor of sub-graph C, node D is the top-layer tensor of sub-graph D, and node E is the top-layer tensor of sub-graph E. In implementations, the top layer tensors may be randomly selected. Alternatively, the top-layers tensors may be pre-determined. Starting from each of the top layer tensors, one or more binary trees may be constructed in the subsequent layers. When the size of the sub-graph ending on a current-tier satisfies a preset condition, the decomposition process starting from the associated top-layer tensor ends. When the size of the sub-graph ending on a current-tier does not satisfy the preset condition, the graph decomposition process may further decompose one or more of the tensors associated with the current-tier. The graph decomposition process iterates until the preset condition is satisfied. The preset condition may define a threshold for the number of tensors in the sub-graph. The graph decomposition process ends when the size of the sub-graph becomes less than the pre-set threshold.

In implementations, the graph decomposition at the top-layer of the tensor network may use a multi-partite decomposition algorithm. The multi-partite decomposition algorithm may be configured with a first set of parameters associated with the top-layer decomposition including, but is not limited to, a number of partitions and/or a balance parameter that defines a number of tensors and/or edges in the sub-graphs. The graph decompositions at the layers other than the top-layer may use a bipartition decomposition algorithm. The bipartition decomposition algorithm may be configured with a second set of parameters. In implementations, the second set of parameters may be the same as the first set of parameters. In other implementations, the second set of parameters may define a different number of partitions and/or a different balance parameters associated with the next-tier decomposition.

In implementations, the graph decomposition of a given tensor network may start from the top-layer tensors using the first set of parameters and continue to the tensors in the sub-Sequent sub-layers using the second set of parameters until the size of each sub-graph satisfies the pre-set condition. The first iteration of the graph decomposition yields a plurality of sub-graphs that depict a plurality of contraction sequences of the tensors in the tensor network. By traversing the tensors from the bottom-layer of the sub-graphs to the top-layer, a plurality of contraction trees of the tensor network may be found. In implementations, costs of the plurality of contraction trees may be evaluated to determine an optimal contraction tree. The cost associated with a contraction tree may include a computation cost such as, the number of multiplication operations required in the contraction tree. Additionally or alternatively, the cost associated with a contraction tree may include a storage cost such as, the memory size required to store the new tensors generated during the contraction of two tensors. When the computation cost of a contraction tree is less than a first preset threshold, the contraction tree may be determined as the optimal contraction tree of the tensor network. Additionally or alternatively, when the storage cost of a contraction tree is less than a second preset threshold, the contraction tree may be determined as the optimal contraction tree of the tensor network. In implementations, the cost of the contraction tree may be a sum of the computation costs associated with all the tensors of the contraction tree. In another implementation, the cost of the contraction tree may be a maximum value of the computation costs associated with all the tensors of the contraction tree. In yet another implementations, the cost of the contraction tree may be a sum of the storage space associated with all the tensors of the contraction tree. In another implementation, the cost of the contraction tree may be a maximum value of the storage space associated with all the tensors of the contraction tree.

In implementations, when costs of more than one contraction tree satisfy the requirements of the computation cost and/or the storage cost (i.e., the computation cost being less than the first preset threshold and/or the storage cost being less than the second preset threshold), the contraction tree with the minimum computation cost and/or the minimum storage cost is determined to be the optimal contraction tree.

In implementations, when the computation cost of the contraction tree is greater than the first preset threshold and/or the storage cost of the contraction tree is greater than the second preset threshold, the first set of parameters associated with the top-layer decomposition and the second set of parameters associated with the sub-Sequent layers decomposition may be adjusted and the graph decomposition process may be repeated until the cost associated with at least one contraction tree satisfies the first preset threshold or the second preset threshold. The at least one contraction tree may be set as the optimal contraction tree of the tensor network.

It should be appreciated that the algorithms and the parameters associated with the graph decomposition as well as the cost evaluation of the contraction tree, as described above, are merely for illustration purpose. The present disclosure is not intended to be limiting. Different decomposition algorithms, parameters configuration, and the cost evaluation criteria may be applied to the discovery of the tensor network contraction tree.

Figure 4:
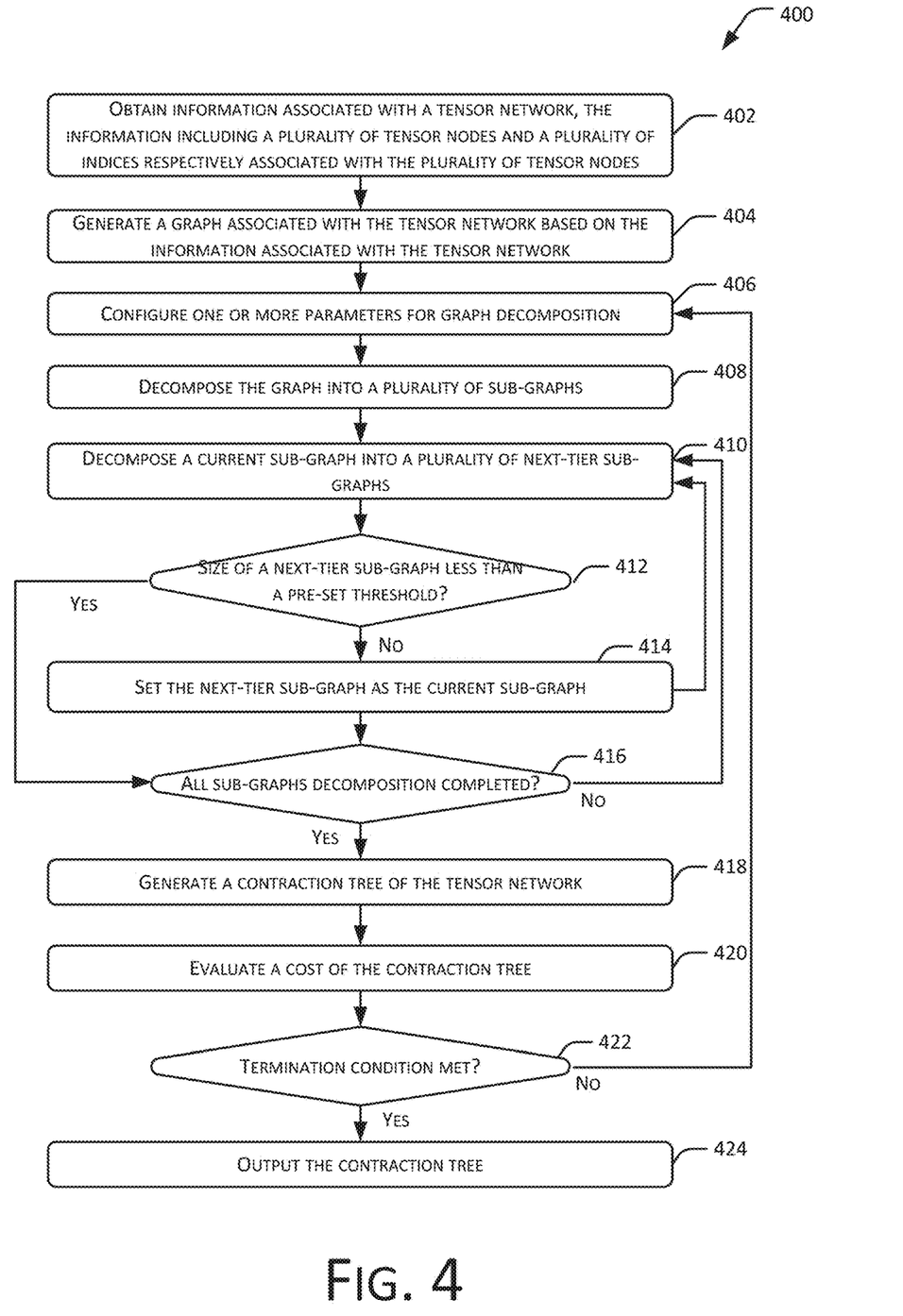
FIG. 4 illustrates an example flow chart of a tensor network contraction method in accordance with an implementation of the present disclosure.

FIG. 4 illustrates an example flow chart of a tensor network contraction method in accordance with an implementation of the present disclosure. The tensor network contraction method 400 may be implemented on one or more tensor nodes of a tensor network. In implementations, the tensor network contraction method may be implemented on one or more remote computing hosts. The tensor network may include, but is not limited to a tensor train/matrix product state (MPS), a projected entangled pair state (PEPS), a multi-scale entanglement renormalization ansatz (MERA), a tree tensor network/hierarchical tucker, etc.

At block 402, a computing host may obtain information associated with a tensor network, the information including a plurality of tensor nodes and a plurality of indices respectively associated with the plurality of tensor nodes. According to example embodiments of the present disclosure, the tensor network may be defined according to states of a known quantum circuit.

At block 404, the computing host may generate a graph associated with the tensor network based on the information associated with the tensor network. The graph is composed of vertices connected by edges. According to example embodiments of the present disclosure, a graph may, for example, be a hypergraph wherein an edge may join any number of vertices. In implementations, the plurality of tensor nodes may correspond to a plurality of vertices in the graph, and the indices associated with the plurality of tensor nodes correspond to the edges of the graph. According to example embodiments of the present disclosure, an edge of a hypergraph which joins more than two vertices may correspond to an index being associated with more than two tensor nodes. In implementations, the computing host may generate a hypergraph associated with the tensor network for decomposition. The hypergraph is composed of vertices connected by hyperedges. The vertices correspond to the tensor nodes and the hyperedges correspond to the indices.

At block 406, the computing host may configure one or more parameters for graph decomposition. The one or more parameters associated with the multi-partite decomposition algorithm may include, but is not limited to, a number of partitions to decompose the current graph from the top-layer, a first balance parameter, etc. The one or more parameters associated with the bipartition decomposition algorithm may include, but is not limited to, a second balance parameter. The first balance parameter and the second balance parameter may include a number of vertices in the next-tier sub-graphs and/or a number of edges in the next-tier sub-graphs. The first balance parameter may be configured the same as the second balance parameter. Alternatively, the first balance parameter may be configured differently from the second balance parameter. In implementations, the multi-partite decomposition algorithm may use any algorithms that take a graph/a hypergraph having a plurality of vertices and edges/hyperedges that represent the tensor network as an input and output a plurality of partitions of the graph. Each of the plurality of partitions represents a sub-graph including a set of tensors of the tensor network.

At block 408, the computing host may decompose the graph into a plurality of sub-graphs. At the top-layer of the graph, the computing host may start graph decomposition using a multi-partite decomposition algorithm. The computing host may determine a number of partitions of the graph.

At block 410, the computing host may decompose a current sub-graph into a plurality of next-tier sub-graphs. In implementations, the computing host may implement a bipartition decomposition algorithm to decompose a current sub-graph into a plurality of next-tier sub-graphs. In implementations, each node in the current-tier may be decomposed into two nodes in the next-tier.

At bock 412, the computing host may determine whether a size of a next-tier sub-graph is less than a pre-set threshold. In implementations, the computing host may perform contraction computation on the vertices in the next-tier sub-graph and compute a count of vertices after the contraction computation.

If the computing host determines that the size of the next-tier sub-graph (i.e., the count of vertices) is no less than the pre-set threshold, at block 414, the computing host may set the next-tier sub-graph as the current sub-graph. The computing host may further reperform graph decomposition of the current sub-graph (i.e., the next-tier sub-graph), as described at block 408.

If the computing host determines that the size of the next-tier sub-graph (i.e., the count of vertices) is less than the pre-set threshold, at block 416, the computing host may determine whether all sub-graphs decomposition is completed.

At block 418, the computing host generates the contraction trees of the tensor network when all sub-graphs decomposition is completed. Each sub-graph corresponds to a contraction tree of the tensor network. Traversing the nodes from the bottom-layer of the sub-graph to the top-layer yields a sequence of tensor contractions.

If all sub-graphs decomposition is not completed, the computing host may return to block 410 to reperform decomposition of another current sub-graph until all sub-graphs decomposition is completed.

If all sub-graphs decomposition is completed, at block 416, the computing host may generate the contraction trees of the tensor network.

At block 420, the computing host evaluates a cost of the contraction tree. The cost of the contraction tree may be evaluated based on the complexity of the contraction computations, i.e., the computation cost. In implementations, when the contraction computation uses tensor dot product, the complexity of the contraction computation is determined based on the index dimensions of tensor nodes in the contraction tree. As one vertex in the contraction tree represents a dot product of two tensor nodes, the complexity associated with the vertex is determined based on the index dimensions of the two tensor nodes. In other implementations, the cost of the contraction tree may be evaluated based on the storage space of the tensors, i.e., the storage cost. The computing host may compute a temporal complexity associated with the vertex. Alternatively, or additionally, the computing host may compute a spatial complexity associated with the vertex. The computing host further determines the cost of the entire contraction tree based on the complexities associated with all the vertices in the contraction tree. For example, the cost of the entire contraction tree may be a sum of the complexities associated with all the vertices. In another example, the cost of the entire contraction tree may be a maximum value of the complexities associated with all the vertices.

At block 422, the computing host determines whether a termination condition is met. The termination condition may be pre-determined threshold indicating a threshold cost of the contraction tree. In implementations, the termination condition may indicate a threshold computation cost. In other implementations, the termination condition may indicate a threshold storage cost. Yet in other implementations, the termination condition may indicate a weighted combination of the threshold computation cost and the threshold storage cost.

When a termination condition is not met, the computing host returns to block 406 to re-preform the graph decomposition. The computing host may re-configure the one or more parameters associated with the decomposition algorithms for the next decomposition iteration. In implementations, the computing host may reconfigure the first set of parameters including the number of partitions associated with the top-layer graph decomposition. Additionally or alternatively, the computing host may reconfigure the second set of parameters including the number of nodes in the sub-graphs and/or the number of edges in the sub-graphs.

When a termination condition is met, the computing host determines that an optimal contraction tree is found. When more than one contract tree meets the termination condition, the computing host may select the contraction tree with the minimum computation cost and the minimum storage cost as the optimal contraction tree. At block 424, the computing host outputs the optimal contraction tree.

A contraction tree according to example embodiments of the present disclosure may be an embedding of all matrix multiplications performed in a graph decomposition. Thus, the space encompassed by the contraction tree may describe the space of matrix multiplications required to represent the states of the known quantum circuit, without encompassing the full dimensional space of quantum computations. This may render the contraction tree more computationally efficient than the original or decomposed graphs for quantum circuit simulation.

It should be appreciated that the order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Figure 5:
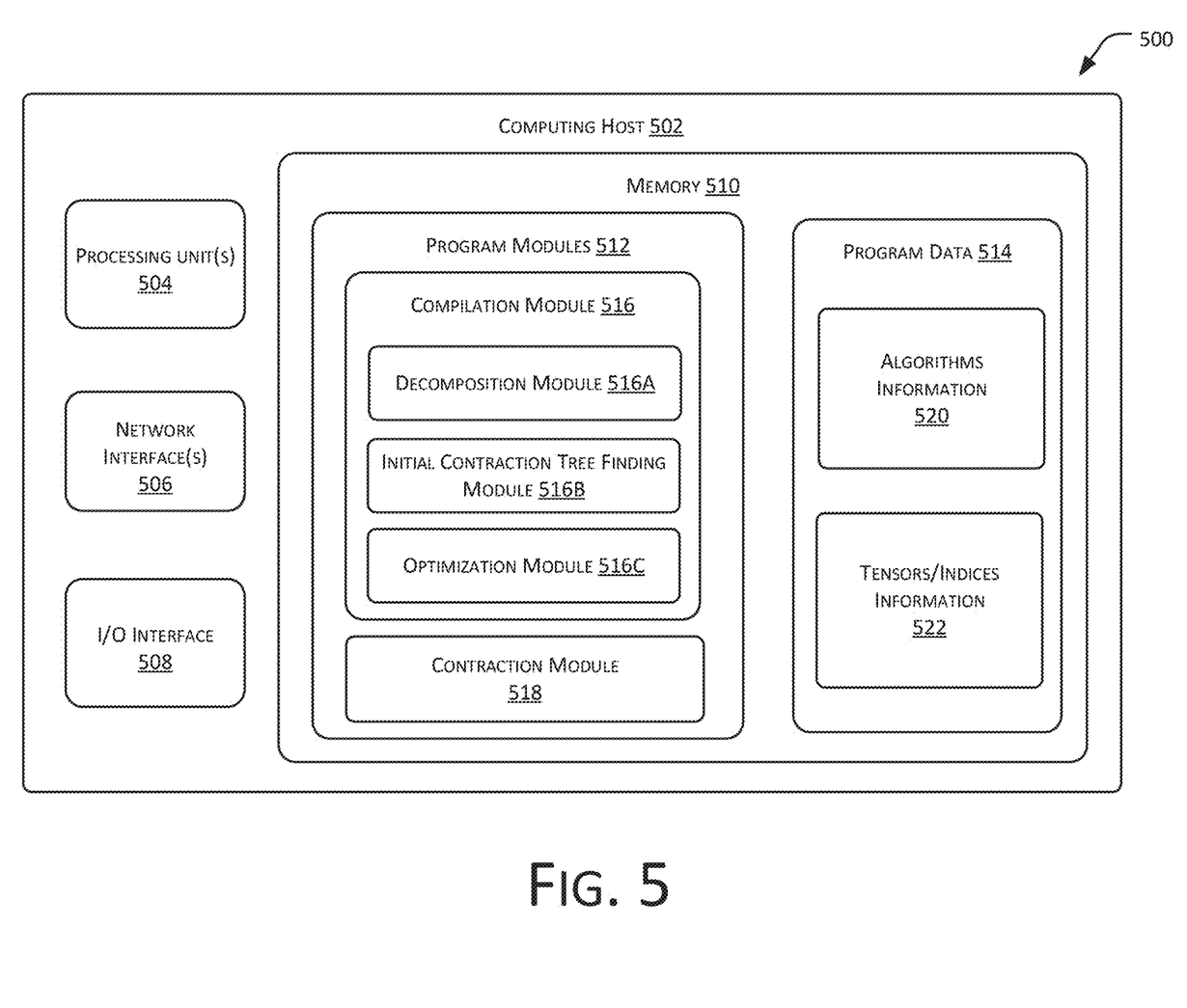
FIG. 5 illustrates an example configuration of a computing host for implementing the tensor network contraction method in accordance with an implementation of the present disclosure.

FIG. 5 illustrates an example configuration of a computing host for implementing the tensor network contraction method in accordance with an implementation of the present disclosure.

The example configuration 500 of the computing host 502 may include, but is not limited to, one or more processing units 504, one or more network interfaces 506, an input/output (I/O) interface 508, and memory 510.

The processing units 504 may be configured to execute instructions that are stored in the memory 510, and/or received from the input/output interface 508, and/or the network interface 506. In implementations, the processing units 504 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc.

The memory 510 may include machine readable media in a form of volatile memory, such as Random Access Memory (RAM) and/or non-volatile memory, such as read only memory (ROM) or flash RAM. The memory 510 is an example of machine readable media. The machine readable media may include a volatile or non-volatile type, a removable or non-removable media, which may achieve storage of information using any method or technology. As defined herein, the machine readable media does not include any transitory media, such as modulated data signals and carrier waves.

The network interfaces 506 may be configured to connect the computing host 502 to other computing hosts via a communication network. In implementations, the network interfaces 506 may be established through a network interface controller (NIC), which may employ both hardware and software in connecting the computing host 502 to the communication network. In implementations, each type of NIC may use a different type of fabric or connector to connect to a physical medium associated with the communication network.

In implementations, the computing host 502 may further include other hardware components and/or other software components, such as program modules 512 to execute instructions stored in the memory 510 for performing various operations, and program data 514 for storing data for tensor network contraction algorithms. In implementations, the program modules 512 may include a compilation module 516 and a contraction module 518.

The compilation module 516 may be configured to perform compilation of tensor network contraction into a series of tensor dot products, which represents a contraction tree. To find the contraction tree of the tensor network, the compilation module 516 may first perform graph decomposition at different tiers of the graph. The decomposition module 516A of the compilation module 516 may be configured to decompose the graph, initially generated corresponding to a tensor network, into a plurality of sub-graphs. In implementations, the graph may be a hypergraph with vertices correspond to the tensor nodes and the hyperedges correspond to the indices. The decomposition module 516A may initialize one or more parameters associated with the decomposition algorithms. The decomposition module 516A may implement a multi-partite decomposition algorithm at the top-layer to decompose the graph. The decomposition module 516A may further iteratively decompose each of the plurality of sub-graphs a plurality of next-tier sub-graphs until a size of each of the plurality of next-tier sub-graphs is less than a pre-set threshold. The decomposition module 516A may implement a bipartition decomposition algorithm to iteratively decompose each of the plurality of sub-graphs other than the top-layer. When next-tier sub-graphs are all decomposed, the decomposition module 516A generates contraction trees according to the sub-graphs and evaluate costs of the contraction trees. If the cost of the contraction tree does not satisfy a minimum cost condition, the decomposition module 516A re-configures the one or more parameters associated with the decomposition algorithms and iteratively performs the decomposition of the graph from the top-layer to until an optimal contraction tree is found.

In implementations, the decomposition module 516A configures a first set of parameters associated with the multi-partite decomposition algorithm and a second set of parameters associated with the bipartition decomposition algorithm. In the first iteration, executing the graph decomposition using the first set of parameters and the second set of parameters yields a first set of sub-graphs corresponding to a plurality of contraction trees. When no optimal contraction tree is found, the decomposition module 516A reconfigures the first set of parameters and/or the second set of parameters. In the second iteration, the decomposition module 516A re-executes the graph decomposition using the reconfigures first set of parameters and/or the second set of parameters to generate a second set of sub-graphs and re-evaluates the performance of a second set of contraction trees. It should be appreciated that the first set of parameter and the second set of parameters described above are merely for illustration purpose. During a single iteration, the first set of parameters and the second set of parameters may remain unchanged as configured. However, one or more of the first set of parameters and the second set of parameters may be dynamically adjusted during a single iteration. The present disclosure is not intended to be limiting.

In implementations, the compilation module 516 may further include an initial contraction tree finding module 516B and an optimization module 516C. The initial contraction tree finding module 516B may be configured to find an optimal contraction tree via hypergraph decomposition. The initial contraction tree finding module 516B may obtain the contraction tree generated by the decomposition module 516A as the initial contraction tree. The optimization module 516C may be configured to dynamically adjust the one or more of the first set of parameters and the second set of parameters for graph decomposition for multiple iterations until an optimal contraction tree is found.

The contraction module 518 may be configured to perform contraction operations of the tensor network. After an optimal contraction tree is found by the compilation module 516, the contraction module 518 performs tensor network contraction by executing the program represented by the optimal contraction tree. As the tensor network is a computational problem and the optimal contraction tree represents a formulation of "compilation" of the computational problem to an executable program, the running time and space of the tensor network contraction greatly depends on the quality of the contraction tree. Therefore, finding an optimal contraction tree makes quantum circuit simulation more efficient The program data 514 may be configured to store algorithm information 520 and tensor/indices information 522. The algorithm information 520 may include one or more algorithms that are used for decomposing and contracting the graph associated with a tensor network. For example, the algorithm information 520 may include, but is not limited to, the multi-partite decomposition algorithm, the bipartition decomposition algorithm, the matrix product computation, tensor dot product computation, etc. The algorithm information 520 may further include the initial configurations of the first set of parameters associated with the multi-partite decomposition algorithm and the second set of parameters associated with the bipartition decomposition algorithm.

The tensor/indices information 522 may include information related to the tensor nodes in the tensor network such as a number of tensor nodes in the tensor network, the connections of the tensor nodes in the tensor network, indices associated with each tensor node in the tensor network.

It should be appreciated that the elements of the computing host 502 described above are merely for the purpose of illustration. The computing host 502 may include more or less of program modules than those illustrated in FIG. 5. The present disclosure is not intended to be limiting.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but is not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIG. 4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the above method blocks are described to be executed in a particular order, in some implementations, some or all of the method blocks can be executed in other orders, or in parallel.

In some instances, one or more components may be referred to herein as "configured to," "configurable to," "operable/operative to," "adapted/adaptable," "able to," "conformable/conformed to," etc. Those skilled in the art will recognize that such terms (i.e., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (i.e., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

It should be appreciated that the order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

EXAMPLE CLAUSES

A. A method implemented by a computing host, the method comprising: obtaining a plurality of tensor nodes associated with a tensor network and a plurality of indices respectively associated with the plurality of tensor nodes; generating a graph associated with the tensor network, wherein the plurality of tensor nodes correspond to a plurality of vertices of the graph and the plurality of indices correspond to a plurality of edges of the graph, respectively; decomposing the graph into a plurality of sub-graphs; and for each sub-graph of the plurality of sub-graphs, iteratively decomposing a current sub-graph into a plurality of next-tier sub-graphs until a size of each of the plurality of next-tier sub-graphs is less than a pre-set threshold.

B. The method as recited in paragraph A, further comprising: generating a plurality of contraction trees associated with the tensor network based on the plurality of next-tier sub-graphs, wherein individual contraction tree includes a set of vertices being traversed in a respective next-tier sub-graph and indices associated with the set of vertices.

C. The method as recited in paragraph A, further comprising: decomposing the graph into the plurality of sub-graphs using a multi-partite decomposition algorithm.

D. The method as recited in paragraph C, further comprising: optimizing one or more first parameters associated with the multi-partite decomposition algorithm.

E. The method as recited in paragraph A, further comprising: iteratively decomposing the current sub-graph into a plurality of next-tier sub-graphs using a bipartition decomposition algorithm.

F. The method as recited in paragraph E, further comprising: optimizing one or more second parameters associated with the bipartition decomposition algorithm.

G. The method as recited in paragraph A, wherein iteratively decomposing a current sub-graph into a plurality of next-tier sub-graphs until a size of each of the plurality of next-tier sub-graphs is less than a pre-set threshold further comprises: determining that a first index of one or more first indices associated with a first node has a same dimension as a second index of one or more second indices associated with a second node in at least one of the plurality of next-tier sub-graphs; contracting the first node and the second node to form a third node; computing a count of nodes in the at least one of the plurality of next-tier sub-graphs; and determining the count of nodes is less than the pre-set threshold.

H. The method as recited in paragraph G, further comprising: generating one or more third indices associated with the third node based on the one or more first indices and the one or more second indices.

I. The method as recited in paragraph B, further comprising: computing costs associated with the plurality of contraction trees; determining whether the cost associated with at least one contraction tree satisfies a pre-set condition; if the cost associated with at least one contraction tree satisfies the pre-set condition, outputting the at least one contraction tree as an optimal contraction tree; and if the cost associated with at least one contraction tree does not satisfy the pre-set condition, adjusting one or more parameters associated with decomposing the graph into a plurality of sub-graphs, iteratively decomposing the graph to generate at least one updated contraction tree until the pre-set condition is satisfied, and outputting the updated contraction tree as the optimal contraction tree.

J. The method as recited in paragraph I, wherein the one or more parameters are associated with at least one of a multi-partite decomposition algorithm and a bipartition decomposition algorithm.

K. A system comprising: one or more processors, and memory communicatively coupled to the one or more processors, the memory storing computer—executable modules executable by the one or more processors that, when executed by the one or more processors, perform actions including: obtaining a plurality of tensor nodes associated with a tensor network and a plurality of indices respectively associated with the plurality of tensor nodes; generating a graph associated with the tensor network, wherein the plurality of tensor nodes correspond to a plurality of vertices of the graph and the plurality of indices correspond to a plurality of edges of the graph, respectively; decomposing the graph into a plurality of sub-graphs; and for each sub-graph of the plurality of sub-graphs, iteratively decomposing a current sub-graph into a plurality of next-tier sub-graphs until a size of each of the plurality of next-tier sub-graphs is less than a pre-set threshold.

L. The system as recited in paragraph K, wherein the actions further comprise: generating a plurality of contraction trees associated with the tensor network based on the plurality of next-tier sub-graphs, wherein individual contraction tree includes a set of vertices being traversed in a respective next-tier sub-graph and indices associated with the set of vertices.

M. The system as recited in paragraph L, wherein the actions further comprise: computing costs associated with the plurality of contraction trees; determining whether the cost associated with at least one contraction tree satisfies a pre-set condition; if the cost associated with at least one contraction tree satisfies the pre-set condition, outputting the at least one contraction tree as an optimal contraction tree; and if the cost associated with at least one contraction tree does not satisfy the pre-set condition, adjusting one or more parameters associated with decomposing the graph into a plurality of sub-graphs, iteratively decomposing the graph to generate at least one updated contraction tree until the pre-set condition is satisfied, and outputting the updated contraction tree as the optimal contraction tree.

N. The system as recited in paragraph M, wherein the one or more parameters are associated with at least one of a multi-partite decomposition algorithm and a bipartition decomposition algorithm.

O. The system as recited in paragraph K, wherein the actions further comprise: decomposing the graph into the plurality of sub-graphs using a multi-partite decomposition algorithm; and iteratively decomposing the current sub-graph into a plurality of next-tier sub-graphs using a bipartition decomposition algorithm.

P. A computer—readable storage medium storing computer—readable instructions executable by one or more processors of a video compression system, that when executed by the one or more processors, cause the one or more processors to perform actions comprising: obtaining a plurality of tensor nodes associated with a tensor network and a plurality of indices respectively associated with the plurality of tensor nodes; generating a graph associated with the tensor network, wherein the plurality of tensor nodes correspond to a plurality of vertices of the graph and the plurality of indices correspond to a plurality of edges of the graph, respectively; decomposing the graph into a plurality of sub-graphs; and for each sub-graph of the plurality of sub-graphs, iteratively decomposing a current sub-graph into a plurality of next-tier sub-graphs until a size of each of the plurality of next-tier sub-graphs is less than a pre-set threshold.

Q. The computer—readable storage medium as recited in paragraph P, wherein the actions further comprise: generating a plurality of contraction trees associated with the tensor network based on the plurality of next-tier sub-graphs, wherein individual contraction tree includes a set of vertices being traversed in a respective next-tier sub-graph and indices associated with the set of vertices.

R. The computer—readable storage medium as recited in paragraph Q, wherein the actions further comprise: computing costs associated with the plurality of contraction trees; determining whether the cost associated with at least one contraction tree satisfies a pre-set condition; if the cost associated with at least one contraction tree satisfies the pre-set condition, outputting the at least one contraction tree as an optimal contraction tree; and if the cost associated with at least one contraction tree does not satisfy the pre-set condition, adjusting one or more parameters associated with decomposing the graph into a plurality of sub-graphs, iteratively decomposing the graph to generate at least one updated contraction tree until the pre-set condition is satisfied, and outputting the updated contraction tree as the optimal contraction tree.

S. The computer—readable storage medium as recited in paragraph R, wherein the one or more parameters are associated with at least one of a multi-partite decomposition algorithm and a bipartition decomposition algorithm.

T. The computer—readable storage medium as recited in paragraph P, wherein the actions further comprise: decomposing the graph into the plurality of sub-graphs using a multi-partite decomposition algorithm; and Iteratively decomposing the current sub-graph into a plurality of next-tier sub-graphs using a bipartition decomposition algorithm.

What is claimed is:

1. A method implemented by a computing host, the method comprising:
    obtaining a plurality of tensor nodes associated with a tensor network that is defined according to states of a quantum circuit and a plurality of indices respectively associated with the plurality of tensor nodes;
    generating a graph associated with the tensor network, wherein the plurality of tensor nodes correspond to a plurality of vertices of the graph and the plurality of indices correspond to a plurality of edges of the graph, respectively;
    decomposing the graph into a plurality of sub-graphs using a multi-partite decomposition algorithm associated with a first set of parameters;
    for each sub-graph of the plurality of sub-graphs, iteratively decomposing a current sub-graph into a plurality of next-tier sub-graphs until a size of each of the plurality of next-tier sub-graphs is less than a pre-set threshold using a bipartition decomposition algorithm associated with a second set of parameters, the iteratively decomposing including:
        determining that a first index of one or more first indices associated with a first node has a same dimension as a second index of one or more second indices associated with a second node in at least one of the plurality of next-tier sub-graphs;
        contracting the first node and the second node to form a third node;
        computing a count of nodes in the at least one of the plurality of next-tier sub-graphs; and
        determining the count of nodes is less than the pre-set threshold;
    dynamically optimizing the first set of parameters and/or the second set of parameters to generate a plurality of contraction trees associated with the tensor network that simulates the quantum circuit in a quantum computing simulation platform based on the plurality of next-tier sub-graphs; and
    finding an optimal contraction tree from the plurality of contraction trees that reduces computation time and/or storage space to enable a simulation of quantum computations without fully simulating a full dimensional space of the quantum computations.

2. The method of claim 1, wherein individual contraction tree includes a set of vertices being traversed in a respective next-tier sub-graph and indices associated with the set of vertices.

3. The method of claim 1, further comprising:
    decomposing the graph into the plurality of sub-graphs using a multi-partite decomposition algorithm.

4. The method of claim 3, further comprising:
    optimizing one or more first parameters associated with the multi-partite decomposition algorithm.

5. The method of claim 1, further comprising:
iteratively decomposing the current sub-graph into a plurality of next-tier sub-graphs using a bipartition decomposition algorithm.

6. The method of claim 5, further comprising:
optimizing one or more second parameters associated with the bipartition decomposition algorithm.

7. The method of claim 1, further comprising:
generating one or more third indices associated with the third node based on the one or more first indices and the one or more second indices.

8. The method of claim 2, further comprising:
computing costs associated with the plurality of contraction trees;
determining whether a cost associated with at least one contraction tree satisfies a pre-set condition; and
in response to determining that the cost associated with at least one contraction tree satisfies the pre-set condition, outputting the at least one contraction tree as an optimal contraction tree; or
in response to determining that the cost associated with at least one contraction tree does not satisfy the pre-set condition,
adjusting one or more parameters associated with decomposing the graph into a plurality of sub-graphs;
iteratively decomposing the graph to generate at least one updated contraction tree until the pre-set condition is satisfied, and
outputting the at least one updated contraction tree as the optimal contraction tree.

9. The method of claim 8, wherein the one or more parameters are associated with at least one of a multi-partite decomposition algorithm and a bipartition decomposition algorithm.

10. A system comprising:
one or more processors, and
memory communicatively coupled to the one or more processors, the memory storing computer-executable modules executable by the one or more processors that, when executed by the one or more processors, cause the one or more processors to perform actions including:
obtaining a plurality of tensor nodes associated with a tensor network that is defined according to states of a quantum circuit and a plurality of indices respectively associated with the plurality of tensor nodes;
generating a graph associated with the tensor network, wherein the plurality of tensor nodes correspond to a plurality of vertices of the graph and the plurality of indices correspond to a plurality of edges of the graph, respectively;
decomposing the graph into a plurality of sub-graphs using a first set of parameters;
for each sub-graph of the plurality of sub-graphs, iteratively decomposing a current sub-graph into a plurality of next-tier sub-graphs until a size of each of the plurality of next-tier sub-graphs is less than a pre-set threshold using a bipartition decomposition algorithm associated with a second set of parameters;
dynamically optimizing the first set of parameters and/or the second set of parameters to generate a plurality of contraction trees associated with the tensor network that simulates the quantum circuit in a quantum computing simulation platform based on the plurality of next-tier sub-graphs, a respective contraction tree including a set of vertices being traversed in a respective next-tier sub-graph and indices associated with the set of vertices;
computing costs associated with the plurality of contraction trees;
determining whether a cost associated with at least one contraction tree satisfies a pre-set condition; and
in response to determining that the cost associated with the at least one contraction tree satisfies the pre-set condition, outputting the at least one contraction tree as an optimal contraction tree; or
in response to determining that the cost associated with at least one contraction tree does not satisfy the pre-set condition,
adjusting one or more parameters associated with decomposing the graph into a plurality of sub-graphs,
iteratively decomposing the graph to generate at least one updated contraction tree until the pre-set condition is satisfied, and
outputting the at least one updated contraction tree as the optimal contraction tree.

11. The system of claim 10, wherein the one or more parameters are associated with at least one of a multi-partite decomposition algorithm and a bipartition decomposition algorithm.

12. The system of claim 10, wherein the actions further comprise:
decomposing the graph into the plurality of sub-graphs using a multi-partite decomposition algorithm; and
iteratively decomposing the current sub-graph into a plurality of next-tier sub- graphs using a bipartition decomposition algorithm.

13. A computer-readable storage medium storing computer-readable instructions executable by one or more processors of a video compression system, that when executed by the one or more processors, cause the one or more processors to perform actions comprising:
obtaining a plurality of tensor nodes associated with a tensor network that is defined according to states of a quantum circuit and a plurality of indices respectively associated with the plurality of tensor nodes;
generating a graph associated with the tensor network, wherein the plurality of tensor nodes correspond to a plurality of vertices of the graph and the plurality of indices correspond to a plurality of edges of the graph, respectively;
decomposing the graph into a plurality of sub-graphs using a multi-partite decomposition algorithm associated with a first set of parameters;
for each sub-graph of the plurality of sub-graphs, iteratively decomposing a current sub-graph into a plurality of next-tier sub-graphs until a size of each of the plurality of next-tier sub-graphs is less than a pre-set threshold using a bipartition decomposition algorithm associated with a second set of parameters, the iteratively decomposing including:
determining that a first index of one or more first indices associated with a first node has a same dimension as a second index of one or more second indices associated with a second node in at least one of the plurality of next-tier sub-graphs;
contracting the first node and the second node to form a third node;
computing a count of nodes in the at least one of the plurality of next-tier sub-graphs; and determining the count of nodes is less than the pre-set threshold; and dynamically optimizing the first set of parameters and/or the second set of parameters to generate a plurality of contraction trees associated with the tensor network that simulates the quantum circuit in a quantum computing simulation platform based on the plurality of next-tier sub-graphs.

14. The computer-readable storage medium of claim 13, wherein individual contraction tree includes a set of vertices being traversed in a respective next-tier sub-graph and indices associated with the set of vertices.

15. The computer-readable storage medium of claim 14, wherein the actions further comprise:

computing costs associated with the plurality of contraction trees;

determining that a cost associated with at least one contraction tree does not satisfy a pre-set condition;

adjusting one or more parameters associated with decomposing the graph into a plurality of sub-graphs;

iteratively decomposing the graph to generate at least one updated contraction tree until the pre-set condition is satisfied, and outputting the at least one updated contraction tree as an optimal contraction tree.

16. The computer-readable storage medium of claim 15, wherein the one or more parameters are associated with at least one of a multi-partite decomposition algorithm and a bipartition decomposition algorithm.

17. The computer-readable storage medium of claim 13, wherein the actions further comprise:

decomposing the graph into the plurality of sub-graphs using a multi-partite decomposition algorithm; and iteratively decomposing the current sub-graph into a plurality of next-tier sub-graphs using a bipartition decomposition algorithm.

18. The computer-readable storage medium of claim 14, wherein the actions further comprise:

computing costs associated with the plurality of contraction trees;

determining that a cost associated with at least one contraction tree does satisfies a pre-set condition; and outputting the at least one contraction tree as an optimal contraction tree.

19. The system of claim 10, wherein the iteratively decomposing includes:

determining that a first index of one or more first indices associated with a first node has a same dimension as a second index of one or more second indices associated with a second node in at least one of the plurality of next-tier sub-graphs;

contracting the first node and the second node to form a third node;

computing a count of nodes in the at least one of the plurality of next-tier sub-graphs; and determining the count of nodes is less than the pre-set threshold.

20. The system of claim 10, wherein the actions further comprise decomposing the graph into the plurality of sub-graphs using a multi-partite decomposition algorithm.

* * * * *